United States Patent
Sherlock

(10) Patent No.: US 9,989,636 B2
(45) Date of Patent: Jun. 5, 2018

(54) MULTI-USE DETECTION SYSTEM FOR WORK VEHICLE

(71) Applicant: Deere & Company, Moline, IL (US)

(72) Inventor: Lance R. Sherlock, Asbury, IA (US)

(73) Assignee: Deere & Company, Moline, IL (US)

( * ) Notice: Subject to any disclaimer, the term of this patent is extended or adjusted under 35 U.S.C. 154(b) by 390 days.

(21) Appl. No.: 14/669,710

(22) Filed: Mar. 26, 2015

(65) Prior Publication Data

US 2016/0282465 A1 Sep. 29, 2016

(51) Int. Cl.
*G01S 13/93* (2006.01)
*G01S 13/86* (2006.01)

(52) U.S. Cl.
CPC .......... *G01S 13/931* (2013.01); *G01S 13/862* (2013.01); *G01S 13/867* (2013.01); *G01S 2013/9317* (2013.01); *G01S 2013/9332* (2013.01); *G01S 2013/9364* (2013.01); *G01S 2013/9367* (2013.01); *G01S 2013/9378* (2013.01)

(58) Field of Classification Search
CPC .... G01S 13/931; G01S 13/867; G01S 13/862; G01S 2013/9367; G01S 2013/9317; G01S 2013/9364; G01S 2013/9332; G01S 2013/9378
USPC .......................................................... 342/70
See application file for complete search history.

(56) References Cited

U.S. PATENT DOCUMENTS

| | | | | |
|---|---|---|---|---|
| 4,516,117 A | * | 5/1985 | Couture | B66C 15/045 |
| | | | | 212/280 |
| 5,061,932 A | * | 10/1991 | Tribe | B60G 17/019 |
| | | | | 342/70 |
| 5,087,918 A | | 2/1992 | May et al. | |
| 5,198,800 A | * | 3/1993 | Tozawa | E02F 9/2033 |
| | | | | 212/276 |
| 6,052,079 A | | 4/2000 | Kitahara et al. | |
| 6,055,042 A | | 4/2000 | Sarangapani | |
| 6,393,362 B1 | * | 5/2002 | Burns | G05D 1/0278 |
| | | | | 340/940 |
| 6,980,896 B2 | * | 12/2005 | Stamerra | B60Q 1/46 |
| | | | | 340/465 |
| 7,148,794 B2 | | 12/2006 | Stigall | |
| 7,603,235 B2 | * | 10/2009 | Makela | G05D 1/028 |
| | | | | 180/167 |
| 7,772,969 B2 | * | 8/2010 | Prohaska | B62D 33/0633 |
| | | | | 180/326 |
| 7,890,235 B2 | * | 2/2011 | Self | G01S 3/143 |
| | | | | 340/539.1 |
| 7,984,574 B2 | | 7/2011 | Pfohl et al. | |
| 8,020,657 B2 | | 9/2011 | Allard et al. | |
| 8,248,263 B2 | * | 8/2012 | Shervey | F16P 3/147 |
| | | | | 340/539.1 |

(Continued)

FOREIGN PATENT DOCUMENTS

WO 2012172580 A1 12/2012

*Primary Examiner* — Peter M Bythrow

(57) ABSTRACT

A work vehicle may include a chassis, a plurality of ground-engaging devices connected to the chassis and configured to provide support and traction to the chassis along a ground surface, an operator station connected to the chassis, and a rear object detection system configured to detect a presence of an object in an area at least partially rearward of the operator station. The rear object detection system may be further configured to detect a presence of a depression of the ground surface in the area.

18 Claims, 4 Drawing Sheets

(56) References Cited

U.S. PATENT DOCUMENTS

| | | | |
|---|---|---|---|
| 8,315,789 B2* | 11/2012 | Dunbabin | G05D 1/0274 340/436 |
| 8,731,777 B2* | 5/2014 | Castaneda | B62D 15/0265 340/435 |
| 9,030,332 B2* | 5/2015 | Tafazoli Bilandi | E02F 9/24 340/686.1 |
| 2004/0217851 A1 | 11/2004 | Reinhart | |
| 2007/0146123 A1* | 6/2007 | Hessing | G08B 3/10 340/384.4 |
| 2007/0164873 A1* | 7/2007 | Yamada | E02F 9/26 340/679 |
| 2008/0258889 A1* | 10/2008 | Prohaska | B62D 33/0633 340/438 |
| 2008/0266396 A1 | 10/2008 | Stein | |
| 2009/0229150 A1* | 9/2009 | Pfohl | B60R 1/00 37/403 |
| 2010/0036645 A1* | 2/2010 | McAree | B60T 7/22 703/1 |
| 2011/0254700 A1 | 10/2011 | Gharsalli et al. | |
| 2013/0158818 A1* | 6/2013 | Callaway | E02F 3/845 701/50 |
| 2014/0203959 A1 | 7/2014 | Kriel et al. | |
| 2014/0266859 A1 | 9/2014 | Kurihara et al. | |
| 2014/0375503 A1 | 12/2014 | Kurihara et al. | |

* cited by examiner

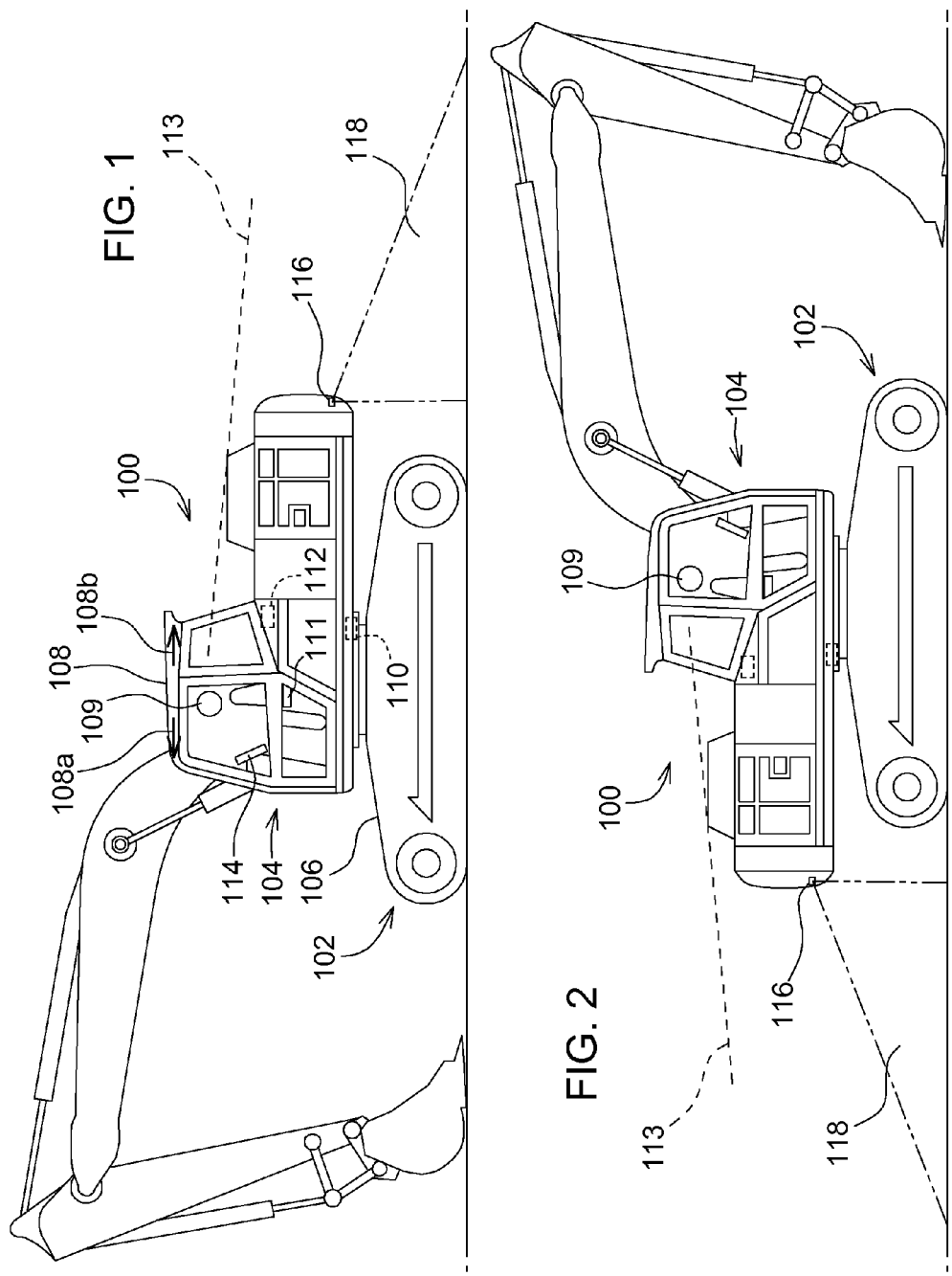

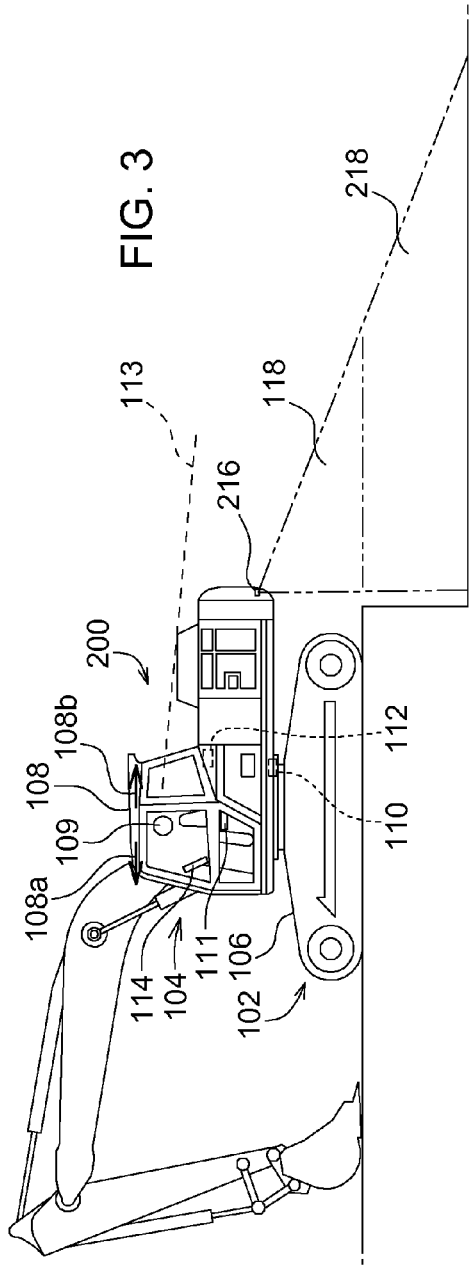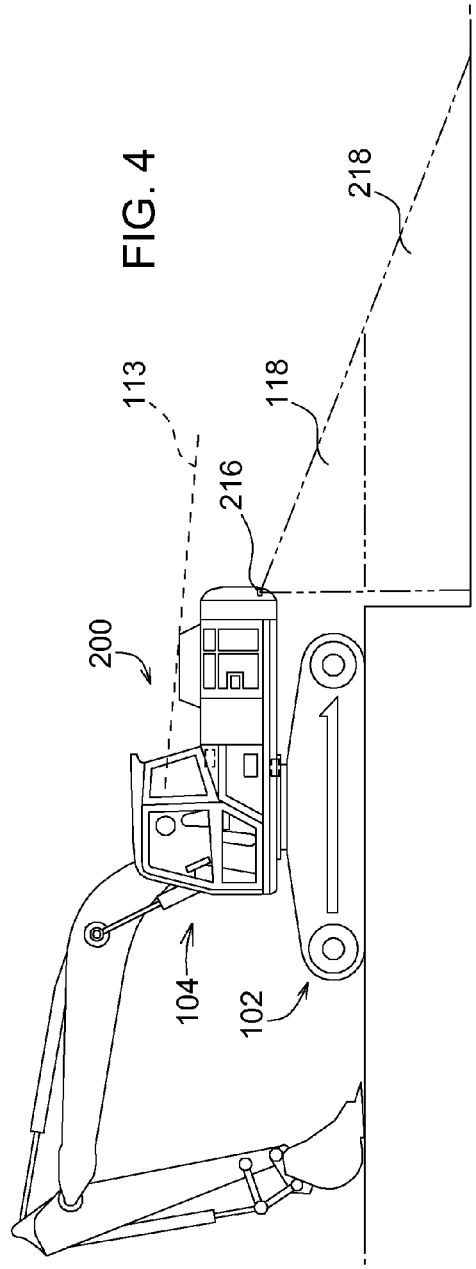

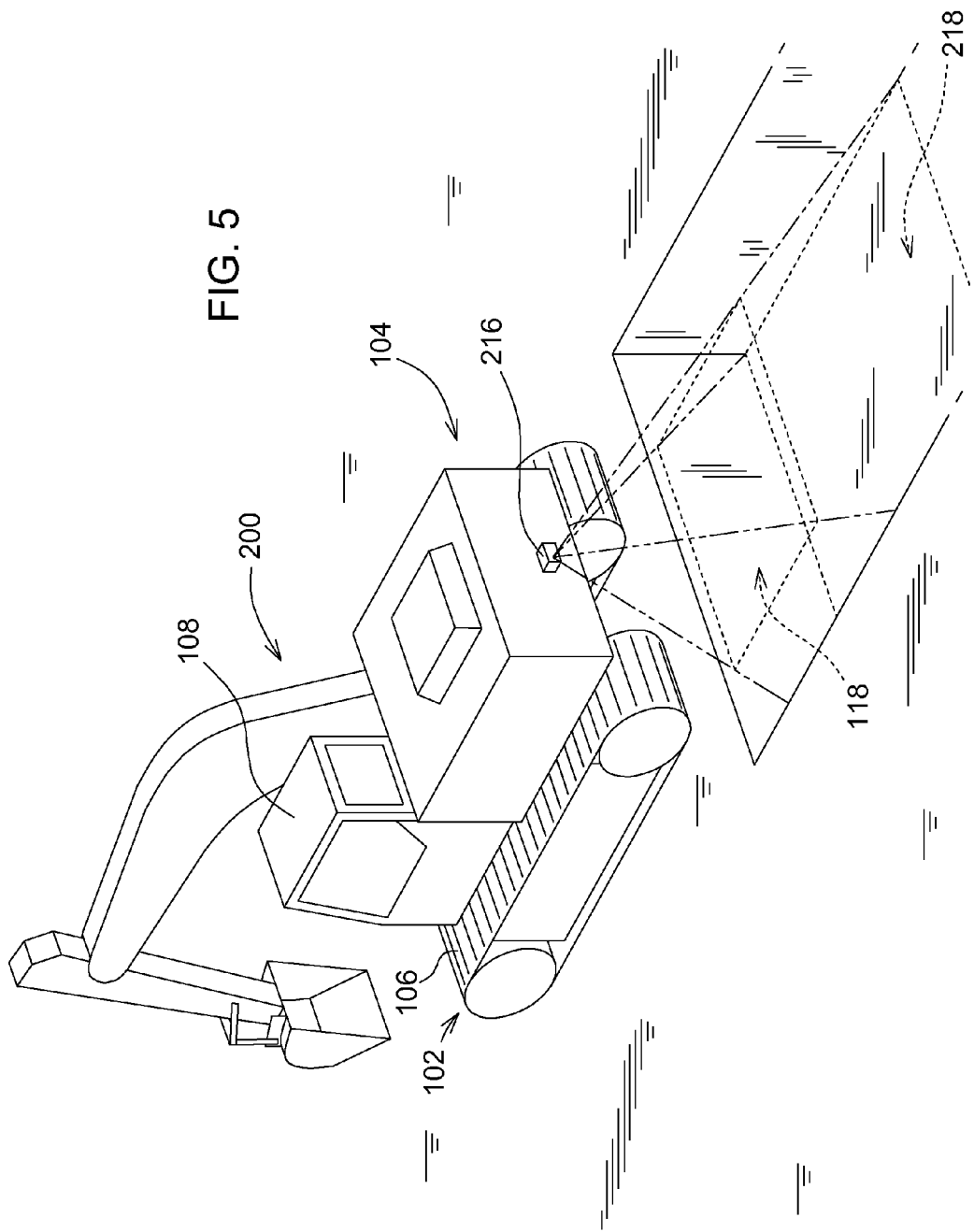

MULTI-USE DETECTION SYSTEM FOR WORK VEHICLE

FIELD OF THE DISCLOSURE

The present disclosure relates to a machine and a method. An aspect of the present disclosure relates to a backup detection system for a work vehicle and a method of alerting a user backing up a work vehicle.

BACKGROUND

Work vehicles may be operated in a forward mode in which the work vehicle travels in a certain direction, often the direction the operator is facing, and a reverse mode (backing up), often the opposite direction of the direction the operator is facing. Work vehicles may be equipped with a system to detect objects located behind the work vehicle.

SUMMARY

According to an aspect of the present disclosure, a work vehicle may include a chassis, a plurality of ground-engaging devices, an operator station, and a rear object detection system. The plurality of ground-engaging devices may be connected to the chassis and configured to provide support and traction to the chassis along a ground surface. The operator station may be connected to the chassis. The rear object detection system may be configured to detect a presence of an object in an area at least partially rearward of the operator station. The rear object detection system may be further configured to detect a presence of a depression of the ground surface in the area.

According to another aspect of the present disclosure, the rear object detection system may be configured to send radio waves, receive radio waves, and analyze the received radio waves to detect the presence of an object and the presence of a depression.

According to another aspect of the present disclosure, the rear object detection system may include a radio wave transmitter, a radio wave receiver, and a processor. The radio wave transmitter may be configured to transmit radio waves to the area. The radio wave receiver may be configured to receive radio waves traveling from the area to the radio wave receiver. The processor may be configured to analyze the received radio waves to detect the presence of an object. The processor may also be configured to analyze the received radio waves to detect the presence of a depression.

According to another aspect of the present disclosure, the processor may be configured to detect the presence of a depression by comparing the received radio waves to a baseline indicative of an absence of a depression of the ground surface in the area.

According to another aspect of the present disclosure, the processor may be configured to detect the presence of a depression by comparing a signal strength of the received radio waves to a signal strength of the baseline.

According to another aspect of the present disclosure, an operator seat may be included in the operator station. The area may be at least partially out of a line-of-sight of an operator seated in the operator seat.

According to another aspect of the present disclosure, the area may be at least partially out of a line-of-sight of the operator seat.

According to another aspect of the present disclosure, the area may be at least partially out of a line-of-sight of the operator station.

According to another aspect of the present disclosure, a work vehicle may include an upper chassis, a lower chassis pivotally connected to the upper chassis, a plurality of ground-engaging devices, an operator station, a sensor assembly, a rear object detection system, and a controller. The plurality of ground-engaging devices may be connected to the lower chassis and configured to provide support and traction to the work vehicle along a ground surface. The operator station may be connected to the upper chassis. The sensor assembly may be configured to provide a position signal indicative of the position of the upper chassis relative to the lower chassis. The rear object detection system may be connected to the upper chassis and configured to provide an object signal indicative of a presence of an object in an area rearward of the operator station. The controller may be configured to receive the position signal and the object signal and provide an alarm signal based on the position signal and the object signal.

According to another aspect of the present disclosure, the operator station may include an operator input. The operator input may provide a command signal indicative of a commanded direction of movement of at least one of the ground-engaging devices. The controller may receive the command signal and be configured to provide the alarm signal based on the position signal, the object signal, and the command signal.

According to another aspect of the present disclosure, the alarm signal may indicate an alarm when the position signal and the command signal indicate a commanded movement in a rearward direction for the upper chassis. The object signal may indicate the presence of an object in the area.

According to another aspect of the present disclosure, the rear object detection system, au be further configured to provide a depression signal indicative of a presence of a depression of the ground surface in the area. The controller may be configured to receive the depression signal and provide the alarm signal based on the position signal, the object signal, the depression signal, and the command signal.

According to another aspect of the present disclosure, the rear object detection system may include a radio wave transmitter, a radio wave receiver, and a processor. The radio wave transmitter may be configured to transmit radio waves to the area. The radio wave receiver may be configured to receive radio waves traveling from the area to the radio wave receiver. The processor may be configured to provide the object signal based on the received radio waves. The processor may also be configured to provide the depression signal based on the received radio waves.

According to another aspect of the present disclosure, the processor may be configured to provide the depression signal based on a comparison of the received radio waves to a baseline, where the baseline is indicative of an absence of a depression of the ground surface in the area.

According to another aspect of the present disclosure, the processor may be configured to provide the depression signal based on a comparison of a signal strength of the received radio waves to a signal strength of the baseline.

According to another aspect of the present disclosure, the alarm signal may indicate an alarm when the position signal and the command signal indicate a commanded movement in a rearward direction for the upper chassis, and the depression signal indicates the presence of a depression in the area.

According to another aspect of the present disclosure, a method may include transmitting radio waves into an area rearward of a work vehicle, sensing radio waves received from the direction of the area, providing an object signal indicative of a presence of an object in the area based on the sensed radio waves, providing an depression signal indicative of a presence of a depression of the ground surface in the area based on the sensed radio waves, receiving a command signal indicative of a command from an operator to move the work vehicle along a ground surface, activating an object alarm if the object signal indicates the presence of an object and the command signal indicates a command to move the vehicle rearward, and activating a depression alarm if the depression signal indicates the presence of a depression and the command signal indicates a command to move the vehicle rearward.

According to another aspect of the present disclosure, the method may include receiving a position signal indicative of a position of an upper chassis of the work vehicle relative to a lower chassis of the work vehicle and activating the object alarm if the object signal indicates the presence of an object and (i) the command signal indicates a command to move the lower chassis of the vehicle rearward and the position signal indicates a heading of the upper chassis is within 90 degrees of a heading of the lower chassis or (ii) the command signal indicates a command to move the lower chassis of the vehicle forward and the position signal indicates the heading of the upper chassis is not within 90 degrees of the heading of the lower chassis.

According to another aspect of the present disclosure, the method may include receiving a position signal indicative of a position of an upper chassis of the work vehicle relative to a lower chassis of the work vehicle and activating the depression alarm if the depression signal indicates the presence of a depression and (i) the command signal indicates a command to move the lower chassis of the vehicle rearward and the position signal indicates a heading of the upper chassis is within 90 degrees of a heading of the lower chassis or (ii) the command signal indicates a command to move the lower chassis of the vehicle forward and the position signal indicates the heading of the upper chassis is not within 90 degrees of the heading of the lower chassis.

According to another aspect of the present disclosure, the method may include providing a first tone pattern upon activation of the object alarm and a second tone pattern upon activation of the depression alarm, where the first tone pattern is different than the second tone pattern.

The above and other features will become apparent from the following description and accompanying drawings.

BRIEF DESCRIPTION OF THE DRAWINGS

The detailed description of the drawings refers to the accompanying figures in which:

FIG. 1 is a side view of a first work vehicle with a rear object detection system configured to detect objects behind the work vehicle, with an upper chassis oriented in the same direction as a lower chassis.

FIG. 2 is a side view of the first work vehicle with the upper chassis oriented in the opposite direction as the lower chassis.

FIG. 3 is a side view of a second work vehicle with a rear object detection system configured to detect the presence of an object behind the work vehicle or the presence of a depression on a ground surface behind the work vehicle, with an upper chassis oriented in the same direction as a lower chassis.

FIG. 4 is a side view of the second work vehicle, with the upper chassis oriented in the opposite direction as the lower chassis.

FIG. 5 is a perspective view of the second work vehicle, with the upper chassis oriented in the opposite direction as the lower chassis.

Like reference numerals are used to indicate like elements throughout the several figures.

DETAILED DESCRIPTION

Figure 6:
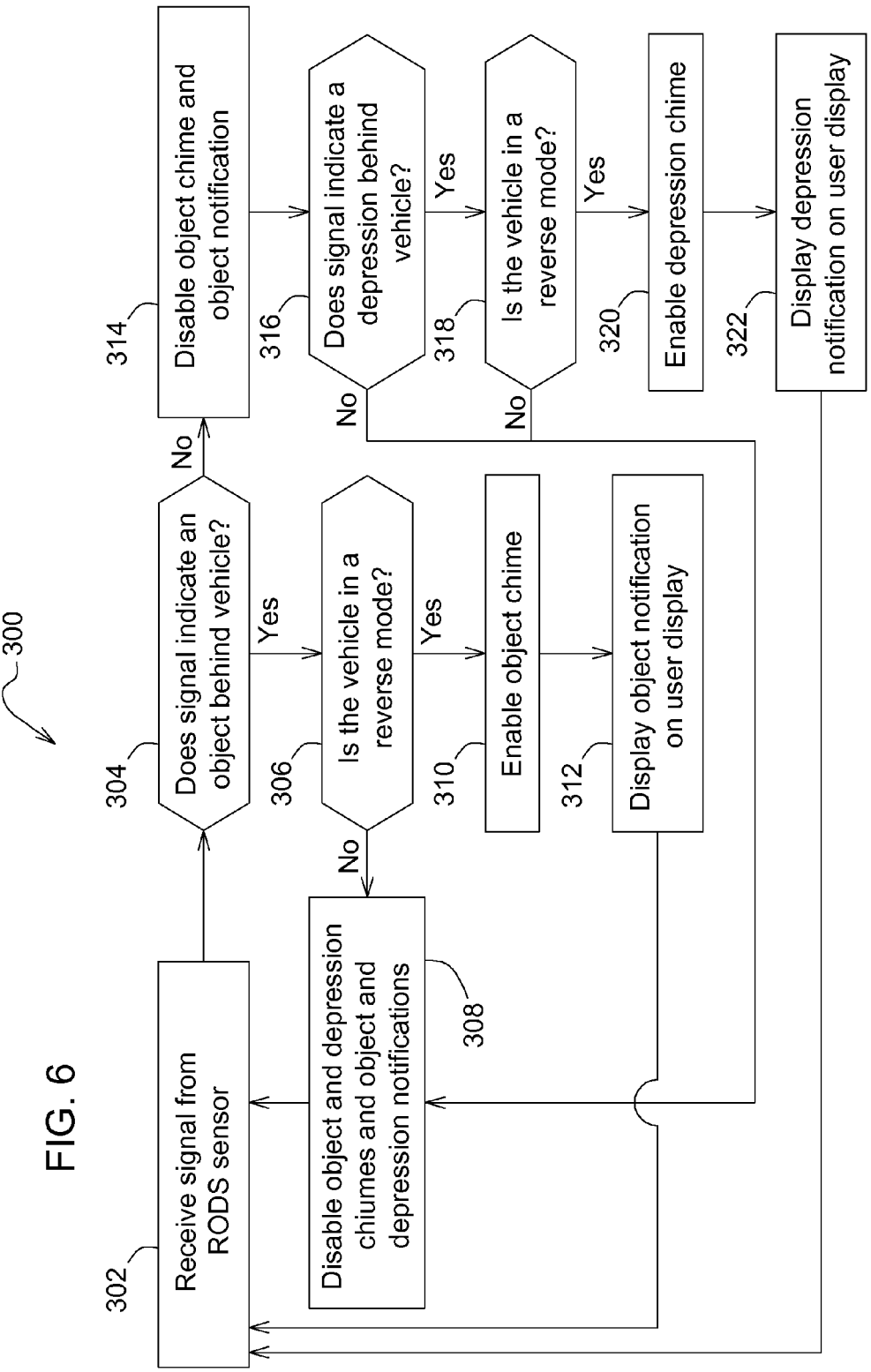
FIG. 6 is a flowchart of a method for alerting an operator to the presence of an object or depression located behind a work vehicle.

FIG. 1 and FIG. 2 illustrate work vehicle 100 including lower chassis 102 in contact with a ground surface and upper chassis 104 connected to lower chassis 102. Lower chassis 102, which may also be referred to as an undercarriage, supports work vehicle 100 and provides tractive effort through ground-engaging devices 106. Ground-engaging devices 106 provide support and traction to work vehicle 100 along a ground surface, and may be driven by an engine of work vehicle 100 to drive work vehicle 100 forward or rearward. Ground-engaging devices 106 are illustrated as a pair of tracks but may alternatively be wheels in other embodiments. Work vehicle 100 is illustrated as an excavator, but may be any number of construction, forestry, or other off-road work vehicles.

Upper chassis 104 is pivotally connected to lower chassis 102 so as to allow upper chassis 104 to rotate 360 degrees about lower chassis 102, which may also be referred to as slewing or swinging. Due to this arrangement, upper chassis 104 may be oriented in any direction (i.e., heading) relative to lower chassis 102. While movement by lower chassis 102 results in movement of upper chassis 104 in the same direction relative to the ground, the direction of movement experienced by an operator in operator station 108 may vary depending on the orientation of upper chassis 104 relative to lower chassis 102. For example, in FIG. 1 upper chassis 104 is oriented in the same direction as lower chassis 102, and thus forward movement of lower chassis 102 results in forward movement for upper chassis 104. Conversely, in FIG. 2 upper chassis 104 is oriented in the opposite direction as lower chassis 102, and thus forward movement of lower chassis 102 results in rearward movement for upper chassis 104 and movement in rearward direction 108b. Work vehicle 100 may be referred to as traveling rearward, reversing, in a reverse mode, or backing up when operator station 108 is moving in rearward direction 108b, which is rearward relative to the direction of operator 109 seated normally in operator station 108, even if the lower chassis 102 is moving in a forward direction.

Sensor assembly 110 is positioned near the pivotal joint interconnecting upper chassis 104 and lower chassis 102, and is configured to provide a position signal indicative of the position of upper chassis 104 relative to lower chassis 102. For example, sensor assembly 110 may be a rotary position sensor which is configured to measure the relative angle between upper chassis 104 and lower chassis 102. Alternatively, sensor assembly 110 may be a switch which is configured to detect whether upper chassis 104 is positioned in the same direction as lower chassis 102 (i.e., the heading of upper chassis 104 within 90 degrees of the heading of lower chassis 102), or an opposite direction as lower chassis 102 (i.e., the heading of upper chassis 104 is 90-270 degrees away from the heading of lower chassis 102). As another alternative, sensor assembly 110 may consist of a first sensor disposed on lower chassis 102 and configured to provide a first direction signal indicative of the direction of lower chassis 102 and a second sensor disposed on upper chassis 104 and configured to provide a second direction signal indicative of the direction of upper chassis 104. The relative positioning of lower chassis 102 and upper chassis 104 may then be determined by comparing the first direction signal and the second direction signal.

Sensor assembly 110 may communicate its measurement to a controller on work vehicle 100, such as controller 112. Controller 112 may then determine the expected direction of movement of upper chassis 104 based on the measurement from sensor assembly 110 and the operator's commanded direction of movement for lower chassis 102. For example, if controller 112 receives an operator command signal indicating a command for forward movement of lower chassis 102 and receives a position signal from sensor assembly 110 indicating that upper chassis 104 is positioned 180 degrees relative to lower chassis 102 (i.e., the forward direction for upper chassis 104 is the same as the rearward direction for lower chassis 102), controller 112 can determine that upper chassis 104 will be moving in its rearward direction and thus operator station 108 will be moving in rearward direction 108b and work vehicle 100 will be reversing.

Operator station 108 is mounted on upper chassis 104, and configured to provide a place for an operator to control work vehicle 100, such as operator 109. Operator 109 is seated within operator station 108 on operator seat 111, and from this position operator 109 may input drive commands for work vehicle 100, such as commanding lower chassis 102 to move in a forwards direction or a rearwards direction. The operator may input these commands through the use of one or more pedals. For example, the operator may depress a pedal in a forward direction to command forward movement of ground-engaging devices 106 and depress the same pedal in a backward direction to command reverse movement of ground engaging devices 106. The operator may also be able to command the left and right ground-engaging devices 106 of work vehicle 100 at differing rates, such as commanding the left ground-engaging devices 106 forward at a greater speed than the right ground-engaging devices 106 to turn the vehicle rightward, or in differing directions, such as to turn the vehicle sharply or rotate it in place.

When seated within operator station 108, operator 109 may have direct visibility in forward direction 108a of operator station 108, and operator 109 may turn his or her head while seated to look in rearward direction 108b of operator station 108. However, operator 109 may not have full visibility around the periphery of work vehicle 100. For example, while looking in rearward direction 108b of operator station 108, the lowest operator 109 would be able to see from a seated position on operator seat 111 are objects at or above sight-line 113, which is the sight-line from the operator to a top portion of upper chassis 104. Certain areas surrounding the upper chassis 104 may not have any direct line-of-sight to an operator seated on operator seat 111.

Operator station 108 may also include an operator display 114 which may be used to display information relating to work vehicle 100, such as information about what is immediately behind work vehicle 100, or which may be used by the operator to input commands or data. Operator display 114 may also be capable of generating sounds for the operator, including warning tones or speech, but in alternative embodiments a separate device such as a standalone speaker may be utilized for audio communications. Operator display 114 is in communication with controller 112, enabling controller 112 to communicate with operator display 114 to display messages or generate audible warnings or speech for the operator.

Work vehicle 100 is equipped with a rear object detection system (RODS) 116 which is mounted to the rear of upper chassis 104. RODS 116 is connected to upper chassis 104 and faces outward from the rear of upper chassis 104, giving a line-of-sight to the ground and objects behind upper chassis 104. RODS 116 may be utilized to detect objects located behind upper chassis 104 within a certain distance of work vehicle 100, the distance determined by the capabilities of RODS 116. In this embodiment, RODS 116 utilizes radar to sense objects located behind work vehicle 100 in area 118, but other detection systems may utilize different sensing technologies, including laser (e.g., lidar), sound (e.g., ultrasound/sonar), or image capture (e.g., via one or more cameras). RODS 116 comprises a radio wave transmitter, a radio waver receiver, and a processor. RODS 116 functions by generating radio waves and transmitting them rearward of operator station 108 and rearward of upper chassis 104, into area 118 via the radio wave transmitter, receiving (i.e., sensing) the radio waves after they are reflected off surfaces behind upper chassis 104 and return to RODS 116 via the radio wave receiver, and analyzing the sensed data to determine whether objects are present via the processor. In RODS 116, the radio wave transmitter and radio wave receiver may both be included in a transceiver, a component capable of transmitting and receiving radio waves.

In normal operation, RODS 116 may be configured to detect an object rearward of operator station 108 and rearward of upper chassis 104 by determining whether it senses an object closer than a threshold distance, which may be pre-set or adjustable so as to avoid the ground setting off RODS 116. RODS 116 may also be configured so as to require a detected object be larger than a threshold size before being considered an object, and this threshold size may be pre-set or adjustable, such as based on the distance to the object. In the embodiment illustrated in FIG. 1 and FIG. 2, RODS 116 includes a processor which analyzes the sensed radio waves to determine whether an object is present in area 118 and then communicates an object signal indicative of the presence of an object in area 118 to controller 112. In the embodiment illustrated in FIG. 1 and FIG. 2, the object signal from RODS 116 is a value which indicates the absence of an object (e.g., 0) or the proximity of the object to RODS 116 (e.g., 1, 2, or 3 as the proximity increases). In alternative embodiments, the object signal from RODS 116 may not itself communicate the presence or absence of an object in area 118, but may instead communicate a value representative of the signal strength of the radio waves received by RODS 116 (e.g., from 1-100) which is indicative of the presence of an object in area 118 (or the absence of such an object), and controller 112 may perform further determines using this object signal (e.g., indicating an object if the object signal is 50 or greater). In yet other alternative embodiments, RODS 116 may communicate other data to controller 112, or data in an alternative format, to allow controller 112 to determine whether an object is present in area 118.

In the embodiment illustrated in FIG. 1 and FIG. 2, RODS 116 communicates to controller 112 whether an object is detected rearward of upper chassis 104, within area 118. In alternative embodiments, RODS 116 may communicate further information such as the size of, or distance to, the detected object, to enable controller 112 to take different actions based on the size or distance of the detected object. Area 118 is located rearward of operator station 108 and rearward of upper chassis 104, and is not within a direct line-of-sight to an operator seated on operator seat 111, such as operator 109, although portions may be visible through indirect lines-of-sight such as via mirrors placed on work vehicle 100. In alternative embodiments, area 118 may not be located entirely rearward of upper chassis 104, but may instead be located only partially rearward of upper chassis 104, or may not be entirely outside a direct line-of-sight to an operator seated on operator seat 111.

FIG. 3, FIG. 4, and FIG. 5 illustrate a work vehicle 200, which includes RODS 216. Similar to FIG. 1, FIG. 3 illustrates work vehicle 200 with the upper chassis 104 oriented in the same direction as the lower chassis, and thus forward movement of the lower chassis 102 results in forward movement for the upper chassis 104. Similar to FIG. 2, FIG. 4 illustrates work vehicle with upper chassis 104 oriented in the opposite direction as lower chassis 102, and thus forward movement of lower chassis 102 results in rearward movement for operator station 108 and upper chassis 104.

RODS 216, like RODS 116, utilizes radar to detect objects rearward of operator station 108 and upper chassis 104 in area 118. Unlike RODS 116, RODS 216 is configured to additionally detect the presence of a depression in the ground surface below and rearward of operator station 108 and upper chassis 104 in area 218, and communicate a depression signal to controller 112 indicative of a presence of a depression in area 218 (or the absence of such a depression). RODS 216 may be configured in this manner by hardware changes, including by changes to the radio wave transmitting and receiving elements within RODS 216, and/or by changing how the sensed data is analyzed via the processor in RODS 216. RODS 216 is configured to detect objects within area 118 in the same manner as RODS 116, but additionally analyzes the reflected radio waves to determine whether a ground surface is sensed where area 118 intersects the ground surface, or within area 218. If a ground surface is not detected, or detected at a distance greater than a threshold setting, RODS 216 communicates to controller 112 that a depression is detected below and rearward of upper chassis 104. Similar to RODS 116, the radio wave transmitter and radio wave receiver of RODS 216 may both be included in a transceiver, a component capable of transmitting and receiving radio waves.

For example, RODS 216 may be configured to detect an object if the reflected radio waves result in a signal above a threshold signal strength, the threshold indicative of the expected return signal when no object is present and the radio waves reflect off a ground surface where area 118 meets area 218. This expected return signal may also be referred to as a baseline. In alternative embodiments, the baseline may not be indicative of a particular signal strength, but may instead be indicative of other qualities of the expected return signal such as frequency, distribution, phase, or timing. In the embodiment illustrated in FIGS. 3-5, if the signal falls below the threshold signal strength, RODS 216 may indicate that a depression exists. RODS 216 may be programmed to require the signal strength to vary from the threshold by an amount, which may be pre-set or adjustable, before an indication of either an object or a depression is communicated, thereby changing the size of objects or depressions necessary to trigger RODS 216. By analyzing the reflected radio waves to determine whether the expected signature of the ground surface is present, and present at the expected distance, RODS 216 may be utilized as a multi-use detection system capable of detecting both objects in area 118 and ground surface depressions in area 218 without the need for additional hardware.

RODS 216 may be configured such that it communicates a detected depression to controller 112 only when it detects a depression of sufficient volume, surface area, depth, or some combination of these and other factors. In alternative embodiments, RODS 216 may communication further information such as the size or distance of the detected depression, to enable controller 112 to take different actions based on the size or distance of the detected depression.

FIG. 6 is a flowchart of control system 300 of enabling object and depression chimes and displaying object and depression notifications on work vehicle 200 equipped with RODS 216. In step 302, controller 112 receives a signal from RODS 216. In step 304, controller 112 determines whether the signal received in step 302 indicates that an object is behind work vehicle 200. For example, RODS 216 may communicate a message on a Controller-Area Network (CAN) which indicates a normal status, an object status, or a depression status, and this message may be received on the CAN by controller 112.

If controller 112 determines that the signal indicates an object is behind work vehicle 200, it may proceed to step 306, in which it determines whether work vehicle 200 is in a reverse mode. Controller 112 may determine whether work vehicle 200 is in a reverse mode by a number of different methods. For example, it may keep track of the state of work vehicle 200 and change states when it receives certain inputs from an operator in operator station 108 such as a shift from forward to reverse or a depression of a reverse throttle pedal. As another example, it may determine whether work vehicle 200 is in a reverse mode by monitoring a message from a Transmission Control Unit (TCU) which broadcasts the current state of the transmission of work vehicle 200. As yet another example, it may determine whether work vehicle 200 is in a reverse mode by monitoring the pressure or flow delivered to hydraulic motors which drive ground-engaging devices 106. For work vehicle 200, controller 112 determines whether the vehicle is in a reverse mode by receiving a signal from sensor assembly 110 indicating the position of lower chassis 102 relative to upper chassis 104, and receiving a signal from operator station 108 indicating the direction that the operator is commanding for ground-engaging devices 106. Using both of these as inputs, controller 112 determines whether the operator's command will result in operator station 108 moving in rearward direction 108b and thus whether work vehicle 200 is in a reverse mode. If work vehicle 200 is not in a reverse mode, step 308 is performed next, and any current object or depression chimes or notifications are disabled.

If work vehicle 200 is in a reverse mode, step 310 is performed next. In step 310, controller 112 enables an object chime. This object chime may take multiple forms. In control system 300, a specific chime may be sounded by a speaker in operator station 108, for example a repeating tone, or beeping, which indicates to the operator that an object has been detected behind work vehicle 200 by RODS 216. In alternative embodiments, the object chime may vary depending on the distance or size of the object detected by RODS 216, for example with the object chime growing louder or with shorter intervals between beeps for objects which are larger or closer. Step 312 is performed next, with controller 112 communicating with operator display 114 to display an object notification. This message may take many forms. In the embodiment disclosed in FIG. 6, the notification may be displayed text of the form "Object detected behind vehicle." In alternative embodiments, the text may vary or the notification may include non-text components, such as highlighting or other coloring of the detected object on a video feed from a camera placed to view behind work vehicle 200. After step 312, controller 112 returns to the beginning of the loop with step 302.

If the signal from RODS 216 is not determined to indicate an object behind work vehicle 200 in step 304, then step 314 is performed next. In step 314, any pre-existing object chime or object notification is disabled as no object has been detected, and step 316 is performed next. In step 316, controller 112 determines whether the signal from RODS 216 indicates a depression behind work vehicle 200. If not, controller 112 performs step 308 next, after which controller 112 returns to step 302.

If a depression is detected behind work vehicle 200, step 318 is performed next and controller 112 determines whether work vehicle 200 is in a reverse mode. Similar to step 306, controller 112 may determine whether work vehicle 200 is in a reverse mode by monitoring the state of work vehicle 200, messages from a TCU, inputs from an operator in operator station 108, or monitoring flows and pressures to drive components for ground-engaging devices 106. If work vehicle 200 is not in a reverse mode, step 308 is performed next, after which controller 112 returns to step 302. If work vehicle 200 is in a reverse mode, step 320 is performed next.

In step 320, controller 112 enables a depression chime. Similar to the object chime, the depression chime may take multiple forms. In control system 300, a specific chime which is different than the object chime may be sounded by a speaker in operator station 108, for example a repeating tone, or beeping, which is of a different tone, frequency, intensity, or character than the object chime, may be sounded by a speaker in operator station 108. Similar to the object chime, the depression chime may be varied to indicate the distance to, or size of, the detected depression, including by growing louder or more frequent as the distance to the detected depression is decreased or the size of the detected depression is increased.

In step 320, controller 112 or RODS 216 may optionally analyze the sensed radio waves to determine characteristics of the depression on the ground surface in the area 218 and enable the depression chime based on these characteristics. As one example, controller 112 may analyze a message received from RODS 216 indicative of the size of a depression in the area 218. Controller 112 may enable the depression chime only when the size (e.g., width, depth, volume) indicated by the message is greater than a threshold, and the threshold may be preset, operator adjustable, or set based on a feature of the work vehicle 200 such as a dimension of a ground-engaging device 106 (e.g., length). In this way, controller 112 may vary whether the depression chime is enabled depending on the size of the depression relative to the size of a feature of work vehicle 200. As another example, RODS 216 may analyze the sensed radio waves to determine the position of the depression relative to ground-engaging devices 106 and may communicate a positive indication of a depression to controller 112 only when the depression is determined to be within the expected path of at least one of ground-engaging devices 106.

Step 322 is performed next, with controller 112 communicating with operator display 114 to display a depression notification. This message may take many forms, including displayed text, such as of the form "Depression detected behind vehicle." In alternative embodiments, the text may vary or the notification may include non-text components, such as highlighting or a zoomed-in view of the detected depression on a video feed from a camera placed to view behind work vehicle 200. After step 322, controller 112 returns to the beginning of the loop with step 302.

After step 322, controller 112 may optionally derate work vehicle 200 based on a communication from RODS 216. For example, controller 112 may derate (e.g., limit the maximum speed, acceleration, or power of) work vehicle 200 or force work vehicle 200 to stop if RODS 216 communicates the presence of an object or a depression within a certain distance of one of ground-engaging devices 106 or upper chassis 104. As another example, controller 112 may derate work vehicle 200 if RODS 216 indicates the presence of a depression positioned in the path of one of ground-engaging devices 106, and may eventually prevent further movement of ground-engaging devices 106 toward the depression if the depression is close enough to one of ground-engaging devices 106.

Although FIG. 6 is illustrated as a flowchart, the disclosure is not limited to such steps and the order of steps presented, and it would be well within the skill of one of ordinary skill in the art to reorder, combine, or split many of the steps and achieve the same result.

In alternative embodiments, when both an object and a depression are detected, controller 112 may be configured to operate differently than the embodiment illustrated in FIG. 6. For example, controller 112 may be configured to enable the depression chime and display the depression notification when both an object and a depression are detected. As another example, controller 112 may be configured to enable both the object and depression chimes and display both the object and depression notifications. As yet another example, the chimes and notifications may be the same for both objects and depressions, simplifying control system 300 down to enabling the chime or notification is either an object or depression is detected.

While the disclosure has been illustrated and described in detail in the drawings and foregoing description, such illustration and description is not restrictive in character, it being understood that illustrative embodiment(s) have been shown and described and that all changes and modifications that come within the spirit of the disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A work vehicle comprising:
   an upper chassis;
   a lower chassis pivotally connected to the upper chassis;
   a plurality of ground-engaging devices connected to the chassis and configured to provide support and traction to the chassis along a ground surface;
   an operator station connected to the upper chassis, the operator station includes an operator input, the operator input provides a command signal indicative of a commanded direction of movement of at least one of the ground-engaging devices;
   a sensor assembly configured to provide a position signal indicative of the position of the upper chassis relative to the lower chassis; and
   a rear object detection system configured to detect a presence of an object in an area, the area at least partially rearward of the operator station;

wherein the rear object detection system is further configured to detect a presence of a depression of the ground surface in the area,
a controller coupled to the sensor assembly and the rear object detection system, and configured to provide an alarm signal based on the command signal, the position signal and one of the presence of the object in the area and the presence of the depression of the ground surface in the area;
wherein the alarm signal indicates an alarm when the position signal and the command signal indicate a commanded movement in a rearward direction for the upper chassis, and the object signal indicates the presence of the object in the area.

2. The work vehicle of claim 1, wherein the rear object detection system is configured to send radio waves, receive radio waves, and analyze the received radio waves to detect the presence of the object and the presence of the depression.

3. The work vehicle of claim 2, wherein the rear object detection system comprises a radio wave transmitter, a radio wave receiver, and a processor, the radio wave transmitter is configured to transmit radio waves to the area, the radio wave receiver is configured to receive radio waves traveling from the area to the radio wave receiver, the processor is configured to analyze the received radio waves to detect the presence of the object, and the processor is configured to analyze the received radio waves to detect the presence of the depression.

4. The work vehicle of claim 3, wherein the processor is configured to detect the presence of the depression by comparing the received radio waves to a baseline, the baseline indicative of an absence of the depression of the ground surface in the area.

5. The work vehicle of claim 4, wherein the processor is configured to detect the presence of the depression by comparing a signal strength of the received radio waves to a signal strength of the baseline.

6. The work vehicle of claim 3, further comprising an operator seat included in the operator station, wherein the area is at least partially out of a line-of-sight which is extended from an operator seated in the operator seat to a top portion of the upper chassis.

7. The work vehicle of claim 3, further comprising an operator seat included in the operator station, wherein the area is at least partially out of a line-of-sight which is extended from the operator seat to a top portion of the upper chassis.

8. The work vehicle of claim 3, wherein the area is at least partially out of a line-of-sight which is extended from the operator station to a top portion of the upper chassis.

9. A work vehicle comprising:
an upper chassis;
a lower chassis pivotally connected to the upper chassis;
a plurality of ground-engaging devices connected to the lower chassis and configured to provide support and traction to the work vehicle along a ground surface;
an operator station connected to the upper chassis, the operator station includes an operator input, the operator input provides a command signal indicative of a commanded direction of movement of at least one of the ground-engaging devices;
a sensor assembly configured to provide a position signal indicative of the position of the upper chassis relative to the lower chassis;
a rear object detection system connected to the upper chassis, the rear object detection system configured to provide an object signal indicative of a presence of an object in an area rearward of the operator station; and
a controller configured to receive the command signal, the position signal, and the object signal, the controller configured to provide an alarm signal based on the command signal, the position signal, and the object signal;
wherein the alarm signal indicates an alarm when the position signal and the command signal indicate a commanded movement in a rearward direction for the upper chassis, and the object signal indicates the presence of the object in the area.

10. The work vehicle of claim 9, wherein the rear object detection system is further configured to provide a depression signal indicative of a presence of a depression of the ground surface in the area, the controller is configured to receive the depression signal, and the controller is configured to provide the alarm signal based on the position signal, the object signal, the depression signal, and the command signal.

11. The work vehicle of claim 10, wherein the rear object detection system comprises a radio wave transmitter, a radio wave receiver, and a processor, the radio wave transmitter is configured to transmit radio waves to the area, the radio wave receiver is configured to receive radio waves traveling from the area to the radio wave receiver, the processor is configured to provide the object signal based on the received radio waves, and the processor is configured to provide the depression signal based on the received radio waves.

12. The work vehicle of claim 11, wherein the processor is configured to provide the depression signal based on a comparison of the received radio waves to a baseline, the baseline indicative of an absence of a depression of the ground surface in the area.

13. The work vehicle of claim 12, wherein the processor is configured to provide the depression signal based on a comparison of a signal strength of the received radio waves to a signal strength of the baseline.

14. The work vehicle of claim 10, wherein the alarm signal indicates an alarm when the position signal and the command signal indicate a commanded movement in a rearward direction for the upper chassis, and the depression signal indicates the presence of a depression in the area.

15. A method comprising:
transmitting radio waves into an area rearward of a work vehicle;
sensing radio waves received from the direction of the area;
providing an object signal indicative of a presence of an object in the area based on the sensed radio waves;
providing an depression signal indicative of a presence of a depression of the ground surface in the area based on the sensed radio waves;
receiving a command signal indicative of a command from an operator to move the work vehicle along a ground surface;
receiving a position signal indicative of a position of an upper chassis of the work vehicle relative to a lower chassis of the work vehicle;
activating an object alarm if the object signal indicates the presence of an object, and the position signal and the command signal indicates a command to move the vehicle rearward; and
activating a depression alarm if the depression signal indicates the presence of a depression, and the position signal and the command signal indicates a command to move the vehicle rearward.

16. The method of claim 15, further comprising:
activating the object alarm if the object signal indicates the presence of an object and (i) the command signal indicates a command to move the lower chassis of the vehicle rearward and the position signal indicates a heading of the upper chassis is within 90 degrees of a heading of the lower chassis or (ii) the command signal indicates a command to move the lower chassis of the vehicle forward and the position signal indicates the heading of the upper chassis is not within 90 degrees of the heading of the lower chassis.

17. The method of claim 15, further comprising:
activating the depression alarm if the depression signal indicates the presence of a depression and (i) the command signal indicates a command to move the lower chassis of the vehicle rearward and the position signal indicates a heading of the upper chassis is within 90 degrees of a heading of the lower chassis or (ii) the command signal indicates a command to move the lower chassis of the vehicle forward and the position signal indicates the heading of the upper chassis is not within 90 degrees of the heading of the lower chassis.

18. The method of claim 15, further comprising providing a first tone pattern upon activation of the object alarm and a second tone pattern upon activation of the depression alarm, the first tone pattern different than the second tone pattern.

* * * * *